(12) United States Patent
Arendell

(10) Patent No.: US 10,461,527 B2
(45) Date of Patent: Oct. 29, 2019

(54) BATTERY POWER LIMITING CIRCUIT AND METHOD

(71) Applicant: MOTOROLA SOLUTIONS, INC., Chicago, IL (US)

(72) Inventor: Scott J. Arendell, Buford, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 293 days.

(21) Appl. No.: 15/492,863

(22) Filed: Apr. 20, 2017

(65) Prior Publication Data

US 2018/0309284 A1    Oct. 25, 2018

(51) Int. Cl.
*H02H 9/02* (2006.01)

(52) U.S. Cl.
CPC ...................... *H02H 9/02* (2013.01)

(58) Field of Classification Search
CPC .......... H02H 9/02; H02H 9/025; H02H 9/001; H02H 9/002
USPC ....................................... 361/93.9
See application file for complete search history.

(56) References Cited

U.S. PATENT DOCUMENTS

| | | |
|---|---|---|
| 3,529,210 A | 9/1970 | Ito et al. |
| 3,959,735 A | 5/1976 | GrosJean |
| 4,146,847 A | 3/1979 | Otao et al. |
| 4,296,278 A | 10/1981 | Cullison et al. |
| 4,301,330 A | 11/1981 | Trump |
| 4,427,951 A | 1/1984 | Amada et al. |
| 5,224,169 A | 6/1993 | Morris, Jr. et al. |
| 5,469,002 A | 11/1995 | Garrett |
| 5,631,566 A | 5/1997 | Person et al. |
| 5,847,610 A | 12/1998 | Fujita |
| 5,973,569 A | 10/1999 | Nguyen |
| 6,339,526 B1 | 1/2002 | Aboyoussef et al. |
| 6,545,515 B2 * | 4/2003 | Takahashi .......... H03K 17/0822 327/110 |

(Continued)

FOREIGN PATENT DOCUMENTS

| | | |
|---|---|---|
| GB | 2534949 | 8/2016 |
| WO | 2013019118 | 2/2013 |

OTHER PUBLICATIONS

Office Action from the US Patent and Trademark Office for U.S. Appl. No. 15/155,766 dated Feb. 23, 2018 (10 pages).

(Continued)

*Primary Examiner* — Dharti H Patel
(74) *Attorney, Agent, or Firm* — Michael Best & Friedrich LLP

(57) ABSTRACT

A method and apparatus for a battery protection circuit. One embodiment provides a method for protecting a battery including detecting, with a voltage divider having a first resistor and a second resistor connected in series, a voltage across a first current limiting switch and a second current limiting switch provided on a current path of a battery. The method also includes providing, with a control output provided between the first resistor and the second resistor of the voltage divider, a control signal to the first current limiting switch, wherein the control signal opens and closes the first current limiting switch. The method further includes controlling, with the voltage divider, the first current limiting switch to open when the voltage across the first current limiting switch and the second current limiting switch exceeds a predetermined threshold.

18 Claims, 5 Drawing Sheets

(56) References Cited

U.S. PATENT DOCUMENTS

| | | | |
|---|---|---|---|
| 7,068,012 | B1 | 6/2006 | Geren et al. |
| 8,575,898 | B2 | 11/2013 | Kitano et al. |
| 9,444,248 | B2* | 9/2016 | Erhart .................... H02H 9/025 |
| 2004/0169494 | A1 | 9/2004 | Kim et al. |
| 2005/0242885 | A1 | 11/2005 | Craynon et al. |
| 2006/0052129 | A1 | 3/2006 | Hong et al. |
| 2007/0080745 | A1 | 4/2007 | French et al. |
| 2008/0101638 | A1 | 5/2008 | Ziller |
| 2009/0143111 | A1 | 6/2009 | Oglesbee et al. |
| 2010/0022209 | A1 | 1/2010 | Ng et al. |
| 2011/0182434 | A1 | 7/2011 | Martz et al. |
| 2012/0033820 | A1 | 2/2012 | Wang |
| 2012/0225331 | A1 | 9/2012 | Tartaglia |
| 2013/0077796 | A1 | 3/2013 | Risbo et al. |
| 2013/0181683 | A1 | 7/2013 | Wang et al. |
| 2014/0086418 | A1 | 3/2014 | Lubberhuizen et al. |
| 2015/0086026 | A1 | 3/2015 | Tan et al. |
| 2015/0263684 | A1 | 9/2015 | Tu et al. |
| 2015/0349509 | A1 | 12/2015 | Hingorani et al. |
| 2017/0331304 | A1 | 11/2017 | Arendell et al. |
| 2018/0152785 | A1 | 5/2018 | Yeoh et al. |

OTHER PUBLICATIONS

Office Action from the US Patent and Trademark Office for U.S. Appl. No. 15/155,766 dated Jul. 27, 2018 (11 pages).

PCT/US2017/059020 International Search Report and Written Opinion of the International Searching Authority dated Jan. 5, 2018 (16 pages).

Office Action from the US Patent and Trademark Office for U.S. Appl. No. 15/362,070 dated May 18, 2018 (19 pages).

Office Action from the US Patent and Trademark Office for U.S. Appl. No. 15/362,070 dated Oct. 6, 2017 (24 pages).

Texas Instrument, "ILM4951A (active)—Wide Voltage Range 1.8 Watt Audio Power Amplifier with Short Circuit Protection," technical document (1995-2016) 2 pages, http://www.ti.com/product/LM4951A.

Sibson, "Over-current protection in audio amplifiers," technical document (Aug. 6, 2008) 3 pages, http://www.eetimesti.com/document.asp?doc_id=1274919.

Office Action from the US Patent and Trademark Office for U.S. Appl. No. 15/362,070 dated Jan. 28, 2019 (15 pages).

* cited by examiner

BATTERY POWER LIMITING CIRCUIT AND METHOD

BACKGROUND OF THE INVENTION

Various electronic devices may include internal circuits having metal oxide semi-conductor field effect transistors (MOSFETs) or other switches. These switches may temporarily or permanently become non-functional for various reasons. In these non-functional states, current flow through the switches may generate heat, which may affect other internal components or may radiate to an external surface of the electronic device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
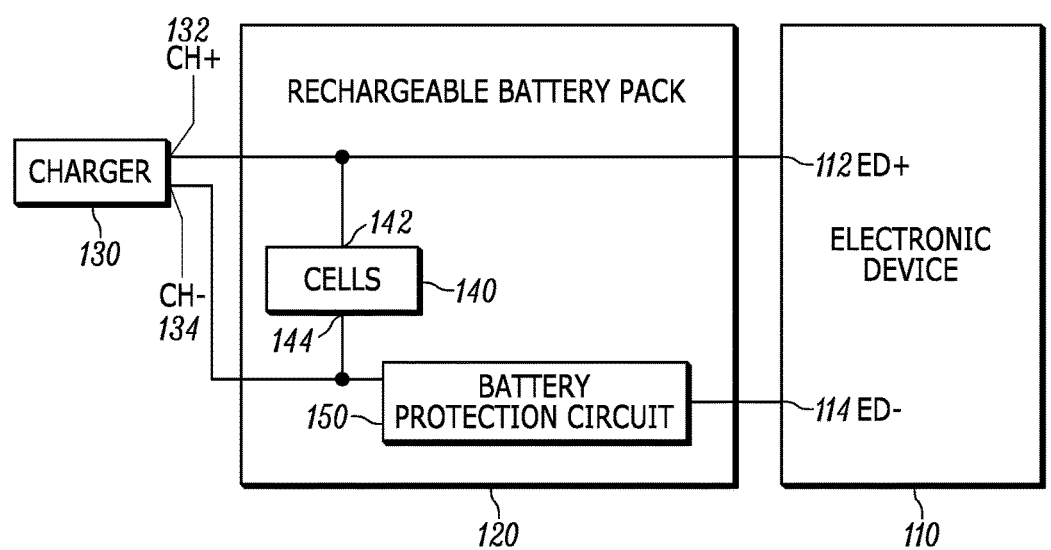
FIG. 1 is a block diagram of an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

When a switch in an electronic device fails, the internal resistance of the switch may increase. A current flowing through this high-resistance switch may increase the heat dissipated by the switch thereby raising the temperature of the device in which the switch is located. The voltage across the switch may also increase due to the increase in the internal resistance of the switch, for example, assuming current does not significantly decrease. Removing the switch from circuit, that is, opening the switch will remove the current flowing through higher internal resistance and, therefore, reduce the heat generated by the switch.

In one example, the heat generated by the switch may be minimized by use of a thermal fuse. The thermal fuse may be provided on a current path of the switch. The thermal fuse cuts off a current supply to the switch when the ambient temperature of the device exceeds a predetermined threshold. In another example, the heat generated by the switch may be minimized by use of a heat spreader element, such as a heat sink. The heat spreader element may be provided in the vicinity of the switch (for example, touching the switch) to limit the heat generated by the switch. However, heat limiting elements (for example, thermal fuse and the like) may generate a false trip even when the switch is not the source of heat generation. In these situations, the heat limiting elements may not remove the source of the heat thereby failing to limit the heat generated by the electronic device.

One embodiment provides a battery protection circuit including a first current limiting switch provided in a current path of a battery and coupled to a first current limiting controller to limit current output by the battery and a second current limiting switch provided on the current path in series with the first current limiting switch and coupled to a second current limiting controller to limit current output by the battery. The battery protection circuit also includes a voltage divider connected across the first current limiting switch and the second current limiting switch. The voltage divider includes a first resistor and a second resistor connected in series. The voltage divider also includes a control output provided between the first resistor and the second resistor and coupled to the first current limiting switch. The control output is configured to provide a control signal that opens the first current limiting switch when the voltage across the first current limiting switch and the second current limiting switch exceeds a predetermined threshold.

Another embodiment provides a method of protecting a battery including detecting, with a voltage divider having a first resistor and a second resistor connected in series, a voltage across a first current limiting switch and a second current limiting switch provided on a current path of a battery. The method also includes providing, with a control output provided between the first resistor and the second resistor of the voltage divider, a control signal to the first current limiting switch, wherein the control signal opens and closes the first current limiting switch. The method further includes controlling, with the voltage divider, the first current limiting switch to open when the voltage across the first current limiting switch and the second current limiting switch exceeds a predetermined threshold.

Another embodiment provides a method of limiting power within a battery of an electronic device including detecting a voltage across a first current limiting switch and a second current limiting switch provided on a current path of the battery and determining whether the voltage across the first current limiting switch and the second current limiting switch exceeds a predetermined threshold. The method also includes generating, with a voltage divider, a control signal to open the current path when the voltage across the first current limiting switch and the second current limiting switch exceeds the predetermined threshold FIG. 1 is a block diagram of one embodiment of an electronic device 110 that includes a first or positive terminal 112 and a second or negative terminal 114. The electronic device 110 may be, for example, a two-way radio, a smart telephone, a tablet computer, a personal computer, and the like that is powered by a rechargeable battery pack 120. The rechargeable battery pack 120 may be charged with an external charger 130 that includes a positive terminal 132 and a negative terminal 134. In some embodiments, the rechargeable battery pack 120 is included in the electronic device 110. In other embodiments, the rechargeable battery pack 120 is removably coupled to the electronic device 110. The charger 130 may be connected to the electronic device 110 to charge the rechargeable battery pack 120 (more particularly in the example shown, to charge battery cells 140). Additionally, the charger 130 may provide power to the electronic device 110.

The rechargeable battery pack 120 includes the battery cells 140 and a battery protection circuit 150. In some embodiments, the battery protection circuit 150 is included in the electronic device 110 rather than in the rechargeable battery pack 120.

The battery cells 140 include a positive terminal 142 connected to the positive terminal 112 of the electronic device 110. The battery cells 140 also include a negative terminal 144 connected to the negative terminal 114 of the electronic device 110 through the battery protection circuit 150. When the charger 130 is connected the rechargeable battery pack 120, the positive terminal 132 of the charger 130 is connected to the positive terminal 112 of the electronic device 110 and the positive terminal 142 of the battery cells 140. The negative terminal 134 of the charger 130 is connected to the negative terminal 114 of the electronic device 110 and the negative terminal 144 of the battery cells 140.

Figure 2:
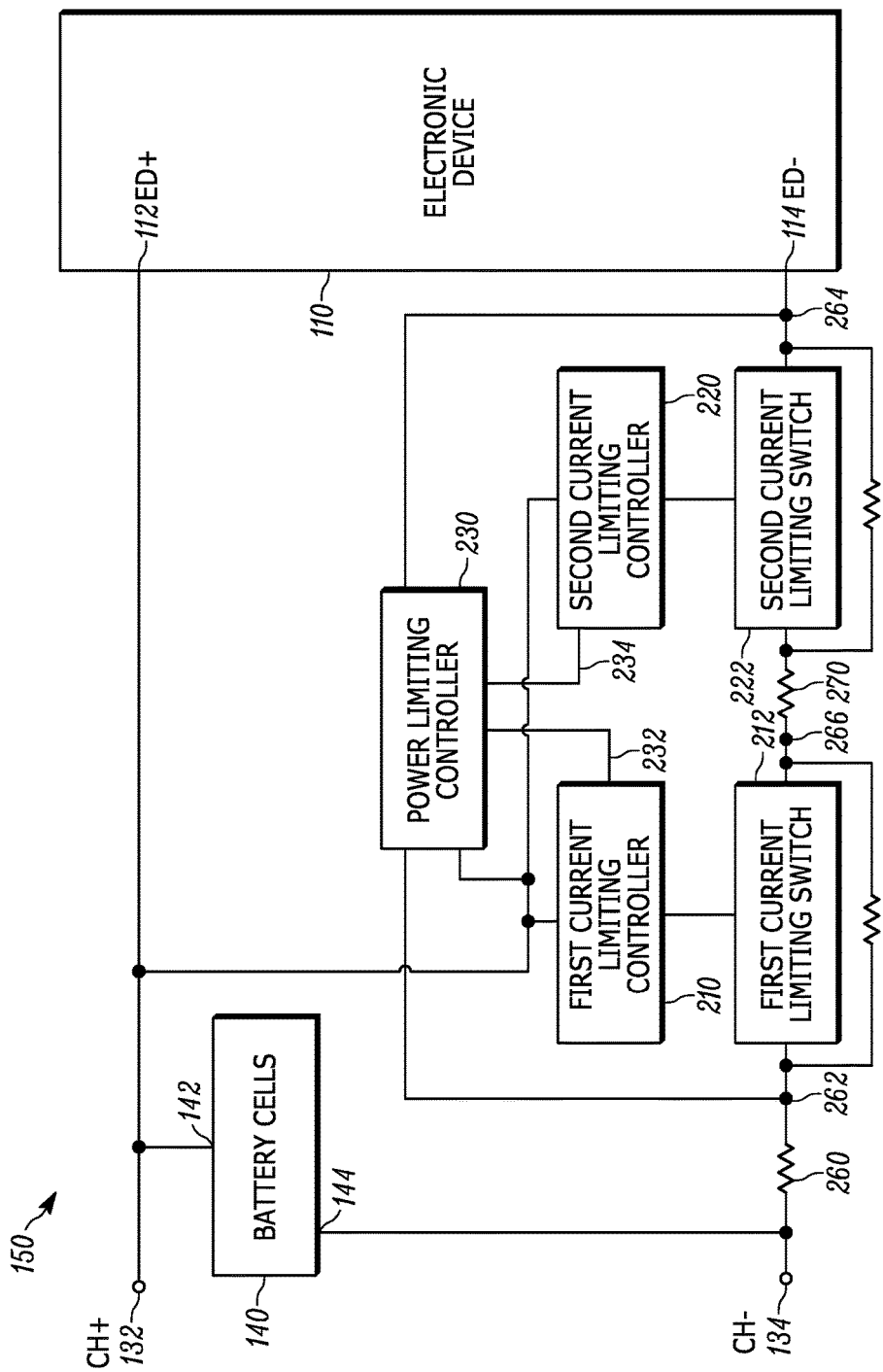
FIG. 2 is a block diagram of a battery protection circuit of the electronic device of FIG. 1 in accordance with some embodiments.

FIG. 2 is a block diagram of one embodiment of the battery protection circuit 150. The battery protection circuit 150 limits excess current flowing through the rechargeable battery pack 120 and the electronic device 110. The battery protection circuit 150 also limits the components of the rechargeable battery pack 120 and the electronic device 110 from generating excess heat. In the example illustrated, the battery protection circuit 150 includes a first current limiting controller 210, a second current limiting controller 220, and a power limiting controller 230. FIG. 1 illustrates only one exemplary embodiment of a battery protection circuit 150. The battery protection circuit 150 may include more or fewer components than illustrated and may perform additional functions other than those described herein.

The first current limiting controller 210 is connected to the positive terminal 142 of the battery cells 140. The first current limiting controller 210 monitors a current flow between the battery cells 140 and the electronic device 110. More specifically, the first current limiting controller 210 monitors a current across a first sense resistor 260. The first current limiting controller 210 provides a control output to a first current limiting switch 212. The first current limiting switch 212 is provided on a current path of the battery pack between the negative terminal 144 of the battery cells 140 and negative terminal 114 of the electronic device 110. When the first current limiting controller 210 determines that the current flowing between the battery cells 140 and the electronic device 110 or between the charger 130 and the electronic device 110 exceeds a predetermined current threshold, the first current limiting controller 210 opens the first current limiting switch 212 to limit the current flow.

The second current limiting controller 220 is connected in series with the first current limiting controller 210 to the positive terminal 142 of the battery cells 140. The second current limiting controller 220 monitors a current flow between the battery cells 140 and the electronic device 110. In one example, the second current limiting controller 220 monitors a current across a second sense resistor 270. An output of the second current limiting controller 220 is provided to a second current limiting switch 222. The first current limiting switch 212 is provided on a current path of the battery pack between the negative terminal 144 of the battery cells 140 and negative terminal 114 of the electronic device 110. The second current limiting switch 222 is connected in series with the first current limiting switch 212, the first sense resistor 260, and the second sense resistor 270 (that is, a resistive element). The second current limiting controller 220 operates similar to the first current limiting controller 210 to control the second current limiting switch 222.

The power limiting controller 230 is connected between the negative terminal 144 of the battery cells 140 and the negative terminal 114 of the electronic device 110. The power limiting controller 230 monitors a voltage between the nodes 262 and 264 (that is, the power limiting controller 230 detects a voltage across the first current limiting switch 212 and the second current limiting switch 222). As described in more detail below, the power limiting controller 230 includes voltage dividers that are connected between the nodes 262 and 264. The voltage dividers provide a first control output 232 to the first current limiting controller 210 and a second control output 234 to the second current limiting controller 220. When the voltage between the nodes 262 and 264 exceeds a predetermined threshold, the power limiting controller 230 controls the first current limiting controller 210 and the second current limiting controller 220 to open the first current limiting switch 212 and the second current limiting switch 222 respectively.

In some embodiments, the battery protection circuit 150 may be connected between the positive terminal 142 of the battery cells 140 and the positive terminal 112 of the electronic device 110 instead of between the negative terminal 144 of the battery cells 140 and the negative terminal 114 of the electronic device 110. That is, the first current limiting switch 212, the second current limiting switch 222, and/or the power limiting controller 230 are, in one example, connected between the positive terminal 142 of the battery cells 140 and a positive terminal 112 of the electronic device 110.

Figure 3:
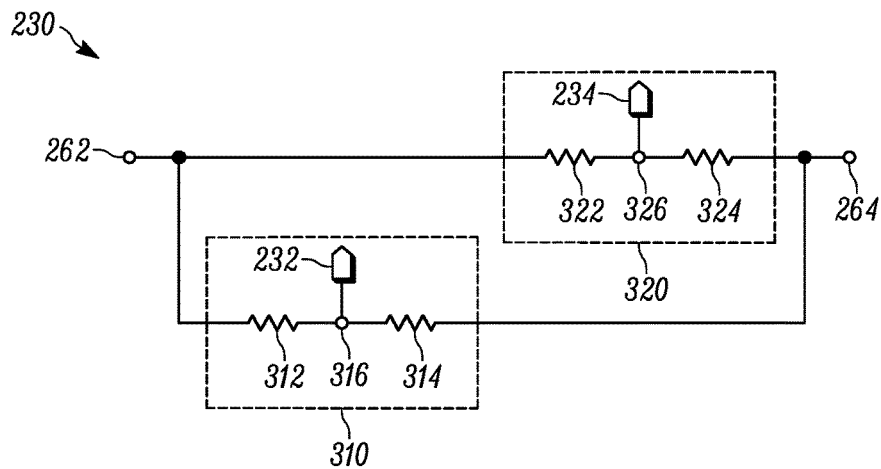
FIG. 3 is a schematic of a power limiting controller of the battery protection circuit of FIG. 2 in accordance with some embodiments.

FIG. 3 is a schematic of one embodiment of the power limiting controller 230. In the example illustrated, the power limiting controller 230 includes a first voltage divider 310 and a second voltage divider 320. The first voltage divider 310 and the second voltage divider 320 receive the voltage between the nodes 262 and 264. The first voltage divider 310 includes two resistors 312 and 314 connected in series between the nodes 262 and 264. A node 316 between the resistors 312 and 314 (for example, a first resistor and a second resistor) provides the first control output 232 to the first current limiting switch 212 (see FIG. 2). Similarly, the second voltage divider 320 includes two resistors 322 and 324 connected in series between the nodes 262 and 264. A node 326 between the resistors 322 and 324 (for example, a third resistor and a fourth resistor) provides the second control output 234 to the second current limiting switch 222 (see FIG. 2). The power limiting controller 230 may include more or fewer components than illustrated and may perform additional functions other than those described herein.

Figure 4:
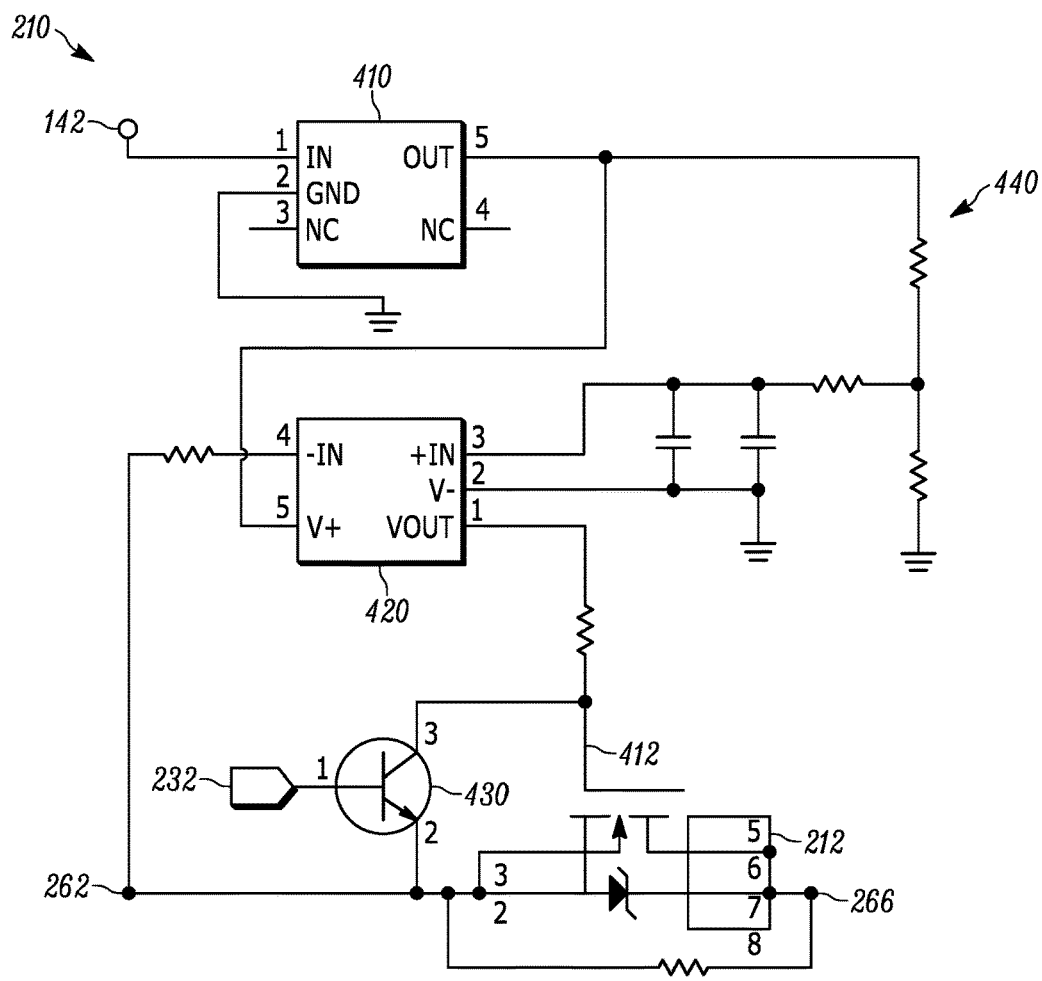
FIG. 4 is a schematic of a current limiting controller of the battery protection circuit of FIG. 2 in accordance with some embodiments.

FIG. 4 is a schematic of one embodiment of the first current limiting controller 210. In the example illustrated, the first current limiting controller 210 includes a first voltage reference chip 410 and a first current comparator 420. The first voltage reference chip 410 is connected to the positive terminal 142 of the battery cells 140 and receives current from the battery cells 140 (see FIG. 2). The first current comparator 420 receives operating power from the first voltage reference chip 410 at the positive supply V+. The first current comparator 420 also receives a reference current from the first voltage reference chip 410 at the non-inverting input IN+ through a first current divider 440. The first current comparator 420 receives the current flowing to the electronic device 110 at the inverting input IN− (see FIG. 2). The output VOUT of the first current comparator 420 controls the first current limiting switch 212. For example, the output VOUT controls the first current limiting switch 212 to open in the event of an overcurrent condition as determined based on the comparison by the first current comparator 420. The first current limiting controller 210 may include more or fewer components than illustrated and may perform additional functions other than those described herein.

The first current limiting switch 212 may be implemented, for example, with a metal oxide semi-conductor field effect transistor (MOSFET). The input of the first current limiting switch 212 is connected to the negative terminal 144 of the battery cells 140. The output of the first current limiting switch 212 is provided to the electronic device 110 through the node 266 and the second current limiting switch 222. In other words, the first current limiting switch 212 is provided on the current path between the battery cells 140 and the electronic device 110. A first control input 412 of the first current limiting switch 212 is connected to the output VOUT of the first current comparator 420. The first control input 412 is also connected to the first control output 232 of the power limiting controller 230 through a first driving switch 430.

The first driving switch 430 may be implemented, for example, with a bipolar junction transistor (BJT). The first driving switch 430 includes a collector terminal (for example, a first driving output) connected to the first control input 412 of the first current limiting switch 212 and the output VOUT of the first current comparator 420. An emitter terminal of the first driving switch 430 is connected to the node 262 and a base terminal (for example, a first driver control input) of the first driving switch 430 is connected to the first control output 232 of the first voltage divider 310. The first driving switch 430 opens the first current limiting switch 212 when the first driving switch 430 is closed by the first control output 232. In some embodiments, the first driving switch 430 may also perform a latching function to prevent the first current comparator 420 from closing the first current limiting switch 212 before the over-current condition is removed. In other words, the first driving switch 430 latches the output of the first current limiting controller 210.

Figure 5:
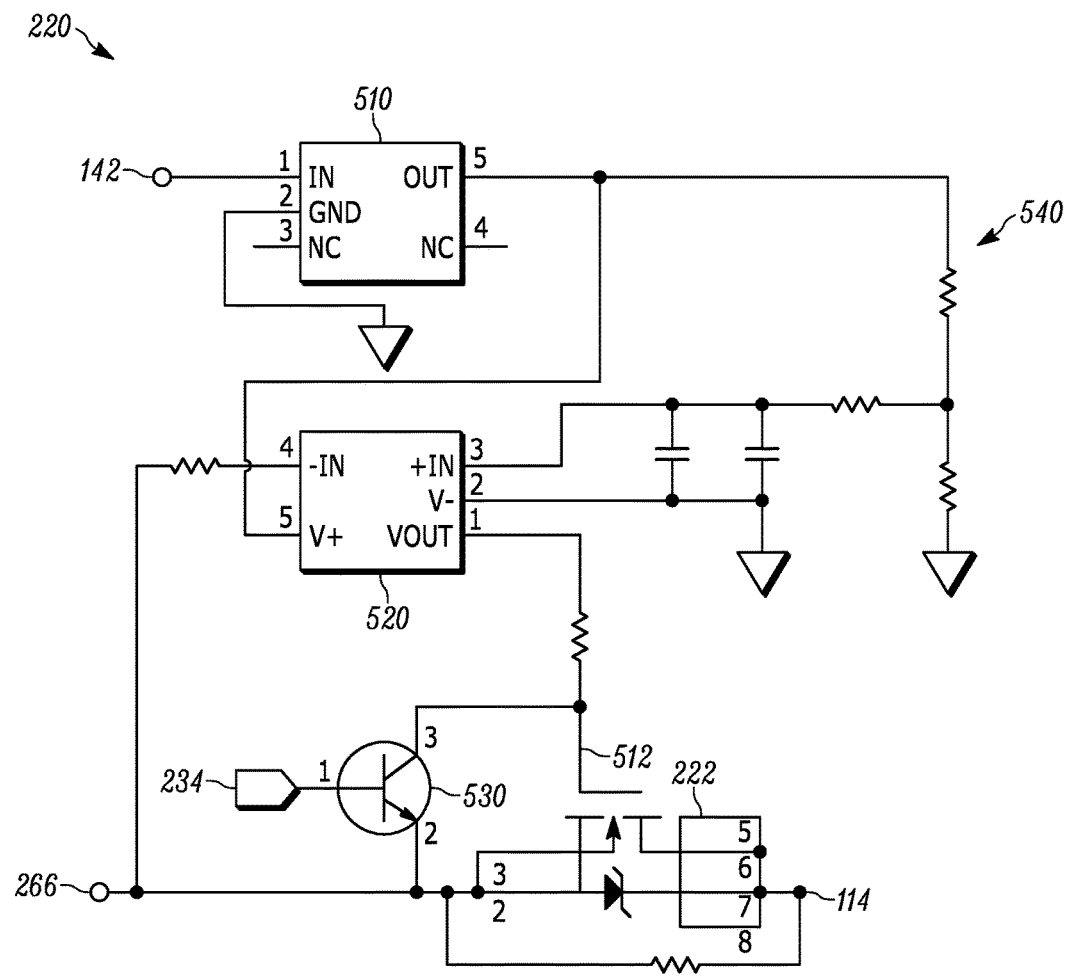
FIG. 5 is a schematic of a current limiting controller of the battery protection circuit of FIG. 2 in accordance with some embodiments.

FIG. 5 is a schematic of one embodiment of the second current limiting controller 220. In the example illustrated, the second current limiting controller 220 includes a second voltage reference chip 510 and a second current comparator 520. The second voltage reference chip 510 is connected to the positive terminal 142 of the battery cells 140 and receives current from the battery cells 140. The second current comparator 520 receives operating power from the second voltage reference chip 510 at the positive supply V+. The second current comparator 520 also receives a reference current from the second voltage reference chip 510 at the non-inverting input IN+ through a second current divider 540. The second current comparator 520 receives the current flowing to the electronic device 110 at the inverting input IN−. The output VOUT of the second current comparator 520 controls the second current limiting switch 222. For example, the output VOUT controls the second current limiting switch 222 to open in the event of an overcurrent condition as determined based on the comparison by the second current comparator 520. The second current limiting controller 220 may include more or fewer components than illustrated and may perform additional functions other than those described herein.

The second current limiting switch 222 may be implemented, for example, with a metal oxide semi-conductor field effect transistor (MOSFET). The input of the second current limiting switch 222 is connected to the negative terminal 144 of the battery cells 140 through the node 266 and the first current limiting switch 212. The output of the second current limiting switch 222 is provided to the electronic device 110. In other words, the second current limiting switch 222 is provided on the current path between the battery cells 140 and the electronic device 110. A second control input 512 of the second current limiting switch 222 is connected to the output VOUT of the second current comparator 520. The second control input 512 is also connected to the second control output 234 of the power limiting controller 230 through a second driving switch 530.

The second driving switch 530 may be implemented, for example, with a bipolar junction transistor (BJT). The second driving switch 530 includes a collector terminal (for example, a second driving output) connected to the second control input 512 of the second current limiting switch 222 and the output VOUT of the second current comparator 520. An emitter terminal of the second driving switch 530 is connected to the node 266 and a base terminal (for example, a second driver control input) of the second driving switch 530 is connected to the second control output 234 of the second voltage divider 320. The second driving switch 530 opens the second current limiting switch 222 when the second driving switch 530 is closed by the second control output 234. In some embodiments, the second driving switch 530 may also perform a latching function to prevent the second current comparator 520 from closing the second current limiting switch 222 before the over-current condition is removed. In other words, the second driving switch 530 latches the output of the second current limiting controller 220.

The second current limiting controller 220 and the second current limiting switch 222 may be redundant circuits provided as a fail-safe for the first current limiting controller 210 and the first current limiting switch 212. In some embodiments, the battery protection circuit 150 may include additional or fewer current limiting controller and current limiting switches based on regulations in the industry and/or other requirements. The power limiting controller 230 may similarly include additional or fewer voltage dividers to match the number of current limiting switches. In one particular embodiment, the battery protection circuit 150 may include three current limiting controller and three current limiting switches. That is, the battery protection circuit 150 may include a third current limiting switch provided on the current path in series with the first current limiting switch 212 and the second current limiting switch 222 and coupled to a third current limiting controller to limit the current output by the battery cells 140. In this embodiment, the power limiting controller 230 may include three voltage dividers, where the voltage dividers may be connected across the first current limiting switch 212, the second current limiting switch 222, and the third current limiting switch.

Figure 6:
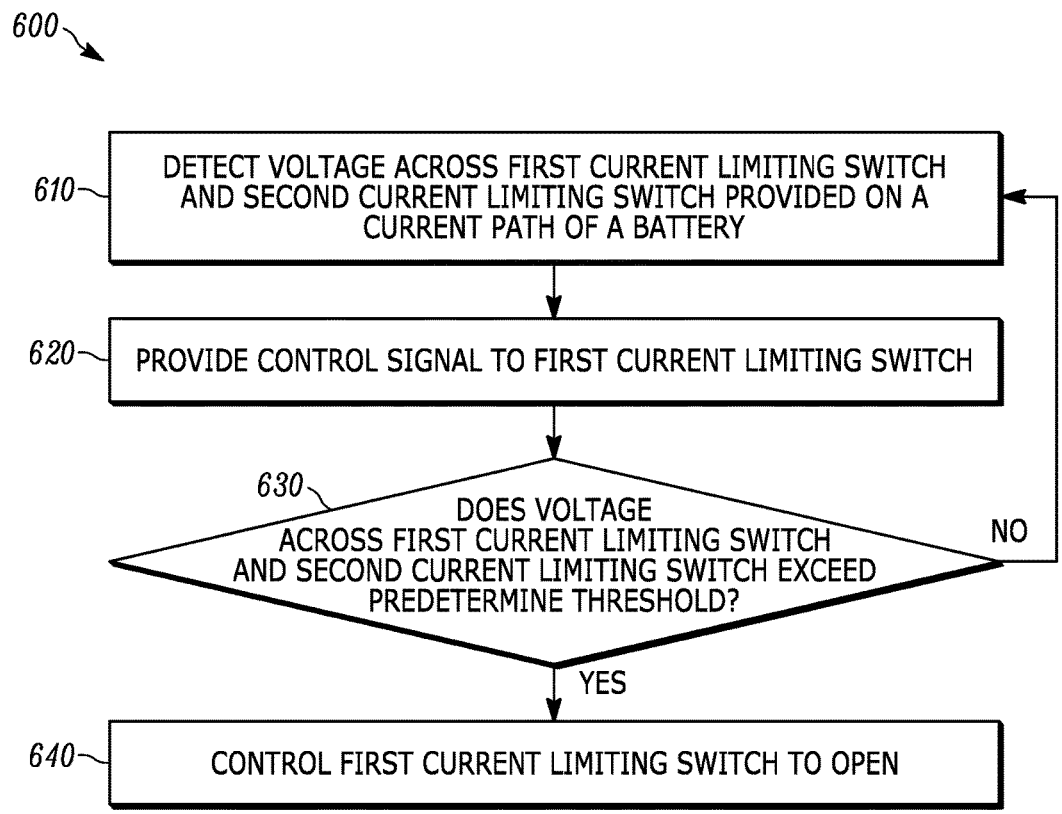
FIG. 6 is a flowchart of a method of protecting a battery in accordance with some embodiments.

FIG. 6 is a flowchart illustrating one example method 600 for protecting the battery cells 140 and the electronic device 110 from excess heat, for example, generated by a malfunctioning component of the electronic device 110 or the rechargeable battery pack 120. As illustrated in FIG. 6, the method 600 includes detecting a voltage across the first current limiting switch 212 and the second current limiting switch 222 provided on the current path of the rechargeable battery pack 120 (at block 610). The voltage across the first current limiting switch 212 and the second current limiting switch 222 is detected with the first voltage divider 310 connected between the nodes 262 and 264. The second voltage divider 320 may also be used to detect the voltage across the first current limiting switch 212 and the second current limiting switch 222.

The method 600 also includes providing a first control signal to the first current limiting switch 212 (at block 620). The first control signal is provided at the first control output 232 of the first voltage divider 310. Similarly, a second control signal is provided to the second current limiting switch 222 at the second control output 234 of the second voltage divider 320.

The method 600 further includes determining whether the voltage across the first current limiting switch 212 and the second current limiting switch 222 exceeds a predetermined threshold (at block 630). The method 600 also includes controlling the first current limiting switch 212 to open when the voltage across the first current limiting switch 212 and the second current limiting switch 222 exceeds the predetermined voltage (at block 640). The resistors 312 and 314 may be selected such that the voltage at node 316 (that is, the first control signal at the first control output 232) closes the first driving switch 430 when the voltage across the first current limiting switch 212 and the second current limiting switch 222 exceeds the predetermined threshold. When the voltage across the first current limiting switch 212 and the second current limiting switch 222 increases, the voltage at node 316 also increases. When the voltage across the first current limiting switch 212 and the second current limiting switch 222 exceeds the predetermined threshold, the first control output 232 closes the first driving switch 430 thereby opening the first current limiting switch 212. The second voltage divider 320 may operate similarly to control the second current limiting switch 222.

Figure 7:
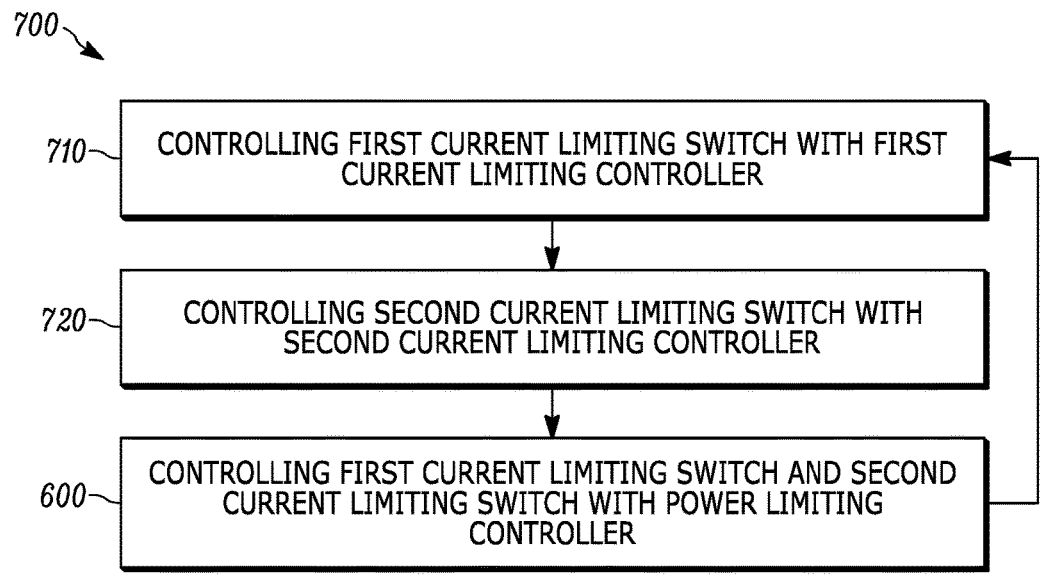
FIG. 7 is a flowchart of a method of limiting current in accordance with some embodiments.

FIG. 7 is a flowchart illustrating one example method 700 of protecting the battery cells 140 and the electronic device 110. As illustrated in FIG. 7, the method 700 includes controlling the first current limiting switch 212 with the first current limiting controller 210 (at block 710). The first current limiting controller 210 receives the current flowing between the battery cells 140 and the electronic device 110 at the inverting input IN− of the first current comparator 420. The first current comparator 420 receives a reference current from the first voltage reference chip 410 at the non-inverting input IN+. When the first current comparator 420 determines that the current through the first current limiting switch 212 (that is, between the battery cells 140 and the electronic device 110) exceeds the reference current, the first current comparator 420 provides a control signal to open the first current limiting switch 212.

The method 700 includes controlling the second current limiting switch 222 with the second current limiting controller 220 (at block 720). The second current limiting controller 220 receives the current flowing between the battery cells 140 and the electronic device 110 at the inverting input IN− of the second current comparator 520. The second current comparator 520 receives a reference current from the second voltage reference chip 510 at the non-inverting input IN+. When the second current comparator 520 determines that the current through the second current limiting switch 222 (that is, between the battery cells 140 and the electronic device 110) exceeds the reference current, the second current comparator 520 provides a control signal to open the second current limiting switch 222.

The method 700 includes controlling the first current limiting switch 212 and the second current limiting switch 222 with the power limiting controller 230 as described above with respect to method 600. The power limiting controller 230, in contrast with the first current limiting controller 210 or the second current limiting controller 220, provides a control output to both the first current limiting switch 212 and the second current limiting switch 222. In one example instance, when the first current limiting switch 212 fails, the voltage across the first current limiting switch 212 increases. However, the current between the battery cells 140 and the electronic device 110 may remain unchanged. In this example instance, the power limiting controller 230 detects that the voltage across the first current limiting switch 212 is above the reference voltage. The power limiting controller 230 opens the second current limiting switch 222 (that is, the control switch) in response to the detection, thereby cutting off the current flow to the first current limiting switch 212. The power limiting controller 230 may perform a similar operation when the second current limiting switch 222 fails.

As such the power limiting controller 230 (for example, the first voltage divider 310 and the second voltage divider 320) minimizes heat generated by a failed current limiting switch without the use of thermal fuse and without the use of heat spreading element. In addition, because the power limiting controller 230 detects a voltage across the first current limiting switch 212 and the second current limiting switch 222 to detect a failed current limiting switch, the power limiting controller 230 avoids falsing. That is, the power limiting controller 230 does not generate a false trip of the battery protection circuit 150.

One advantage of the above techniques is that a faulted switch is detected and prevented from generating excessive heat. The power limiting controller 230 detects a faulted switch and opens the switch to prevent current flowing through the switch. Another advantage of the above techniques is that a faulted switch is detected at low voltages and with high precision. Accordingly, the electronic device 110 may be rated for HAZLOC (Hazardous Locations) conditions. For example, the electronic device 110 may be rated for HAZLOC T120. That is, the electronic device 110 may not exceed a rated temperature of 120° C.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A battery protection circuit comprising:
   a first current limiting switch provided in a current path of a battery and coupled to a first current limiting controller to limit a current output by the battery;
   a second current limiting switch provided on the current path in series with the first current limiting switch and coupled to a second current limiting controller to limit the current output by the battery;
   a voltage divider connected across the first current limiting switch and the second current limiting switch and including:
      a first resistor and a second resistor connected in series, and
      a control output provided between the first resistor and the second resistor and coupled to the first current limiting switch, the control output configured to provide a control signal that opens the first current limiting switch when a voltage across the first current limiting switch and the second current limiting switch exceeds a predetermined threshold; and
   a second voltage divider connected across the first current limiting switch and the second current limiting switch and including:
      a third resistor and a fourth resistor connected in series, and
      a second control output provided between the third resistor and the fourth resistor and coupled to the second current limiting switch, the second control output configured to provide a second control signal that opens the second current limiting switch when the voltage across the first current limiting switch and the second current limiting switch exceeds the predetermined threshold.

2. The battery protection circuit of claim 1, further comprising:
   a first driving switch having a first driver control input coupled to the control output of the voltage divider and a first driving output coupled to a first control input of the first current limiting switch; and
   a second driving switch having a second driver control input coupled to the second control output of the second voltage divider and a second driving output coupled to a second control input of the second current limiting switch.

3. The battery protection circuit of claim 2, wherein the first driving switch is a bipolar junction transistor, wherein a base terminal of the bipolar junction transistor is coupled to the control output of the voltage divider and a collector terminal of the bipolar junction transistor is coupled to the first control input of the first current limiting switch.

4. The battery protection circuit of claim 3, wherein the first driving switch latches an output of the first current limiting controller.

5. The battery protection circuit of claim 1, wherein the voltage divider minimizes heat generated by the first current limiting switch and the second current limiting switch without a thermal fuse.

6. The battery protection circuit of claim 1, wherein the voltage divider minimizes heat generated by the first current limiting switch and the second current limiting switch without use of a heat spreader element.

7. The battery protection circuit of claim 1, wherein the voltage divider avoids falsing.

8. The battery protection circuit of claim 1, further comprising:
a third current limiting switch provided on the current path in series with the first current limiting switch and the second current limiting switch and coupled to a third current limiting controller to limit the current output by the battery, wherein the voltage divider is connected across the first current limiting switch, the second current limiting switch and the third current limiting switch.

9. A method of protecting a battery comprising:
detecting, with a voltage divider having a first resistor and a second resistor connected in series, a voltage across a first current limiting switch and a second current limiting switch provided on a current path of the battery;
providing, with a control output provided between the first resistor and the second resistor of the voltage divider, a control signal to the first current limiting switch, wherein the control signal opens and closes the first current limiting switch;
determining, with the voltage divider, whether the voltage across the first current limiting switch and the second current limiting switch exceeds a predetermined threshold;
controlling, with the voltage divider, the first current limiting switch to open when the voltage across the first current limiting switch and the second current limiting switch exceeds the predetermined threshold,
detecting, with a second voltage divider having a third resistor and a fourth resistor connected in series, the voltage across the first current limiting switch and the second current limiting switch;
providing, with a second control output provided between the third resistor and the fourth resistor of the second voltage divider, a second control signal to the second current limiting switch, wherein the second control signal opens and closes the second current limiting switch;
determining, with the second voltage divider, whether the voltage across the first current limiting switch and the second current limiting switch exceeds the predetermined threshold; and
controlling, with the second voltage divider, the second current limiting switch to open when the voltage across the first current limiting switch and the second current limiting switch exceeds the predetermined threshold.

10. The method of claim 9, wherein providing the control signal to the first current limiting switch further comprises:
providing the control signal to a first driving switch; and
opening the first current limiting switch with the first driving switch.

11. The method of claim 10, further comprising:
limiting, with a first current limiting controller, a current through the current path; and
latching, with the first driving switch, an output of the first current limiting controller.

12. The method of claim 11, wherein limiting the current through the current path further comprises:
opening, with the first current limiting controller, the first current limiting switch when the current through the current path exceeds a predetermined current threshold.

13. The method of claim 9, wherein providing the second control signal to the second current limiting switch further comprises:
providing the second control signal to a second driving switch; and
opening the second current limiting switch with the second driving switch.

14. The method of claim 13, further comprising:
limiting, with a second current limiting controller, a current through the current path; and
latching, with the second driving switch, an output of the second current limiting controller.

15. The method of claim 9, further comprising:
minimizing heat generated by the first current limiting switch and the second current limiting switch without a thermal fuse.

16. A method of limiting power within a battery of an electronic device, the method comprising:
detecting a voltage across a first current limiting switch and a second current limiting switch provided on a current path of the battery;
determining whether the voltage across the first current limiting switch and the second current limiting switch exceeds a predetermined threshold;
generating, with a voltage divider, a control signal to open the current path when the voltage across the first current limiting switch and the second current limiting switch exceeds the predetermined threshold; and
generating, with a second voltage divider, a second control signal to open the current path when the voltage across the first current limiting switch and the second current limiting switch exceeds the predetermined threshold.

17. The method of claim 16, wherein opening the current path comprises opening the first current limiting switch.

18. The method of claim 17, wherein opening the first current limiting switch prevents a current flow through the second current limiting switch.

* * * * *